(12) United States Patent
Oyamada

(10) Patent No.: US 12,229,196 B2
(45) Date of Patent: Feb. 18, 2025

(54) INFORMATION PROCESSING APPARATUS, CLASSIFICATION METHOD, AND STORAGE MEDIUM

(71) Applicant: NEC Corporation, Tokyo (JP)

(72) Inventor: Masafumi Oyamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/274,449

(22) PCT Filed: Mar. 31, 2021

(86) PCT No.: PCT/JP2021/013770
§ 371 (c)(1),
(2) Date: Jul. 26, 2023

(87) PCT Pub. No.: WO2022/208706
PCT Pub. Date: Oct. 6, 2022

(65) Prior Publication Data
US 2024/0095286 A1  Mar. 21, 2024

(51) Int. Cl.
*G06F 16/906* (2019.01)

(52) U.S. Cl.
CPC .................. *G06F 16/906* (2019.01)

(58) Field of Classification Search
CPC ...................................... G06F 16/906
See application file for complete search history.

(56) References Cited

U.S. PATENT DOCUMENTS

| | | | | |
|---|---|---|---|---|
| 11,704,431 | B2 * | 7/2023 | Kraus | H04L 63/0414 726/26 |
| 2008/0177731 | A1 * | 7/2008 | Matsuzaki | G06F 16/353 707/999.005 |
| 2008/0313142 | A1 | 12/2008 | Wang et al. | |
| 2009/0292696 | A1 | 11/2009 | Shuster | |
| 2012/0016875 | A1 | 1/2012 | Jin et al. | |
| 2014/0214835 | A1 * | 7/2014 | Oehrle | G06F 16/35 707/737 |

(Continued)

FOREIGN PATENT DOCUMENTS

| | | |
|---|---|---|
| JP | 2008-204444 A | 9/2008 |
| JP | 2009-266204 A | 11/2009 |

(Continued)

OTHER PUBLICATIONS

JP Office Action for JP Application No. 2023-510005, mailed on May 7, 2024 with English Translation.

(Continued)

*Primary Examiner* — Dangelino N Gortayo
(74) *Attorney, Agent, or Firm* — Sughrue Mion, PLLC

(57) ABSTRACT

In order to automatically classify data without using a classifier constructed by machine learning, an information processing apparatus (1) includes: a data acquiring section (11) for acquiring target data, which is data to be classified into one of a plurality of categories in a hierarchical structure; and a classifying section (12) for classifying the target data into one of the plurality of categories in accordance with (i) a matching degree indicating a degree to which the target data matches that category and (ii) an upper-level matching degree indicating a degree to which the target data matches an upper-level category of that category.

4 Claims, 8 Drawing Sheets

(56) References Cited

U.S. PATENT DOCUMENTS

| | | | |
|---|---|---|---|
| 2016/0335351 A1 | 11/2016 | Volkovs et al. | |
| 2020/0110816 A1* | 4/2020 | Atias | G06F 16/168 |
| 2020/0183893 A1 | 6/2020 | Joshi et al. | |
| 2023/0259531 A1* | 8/2023 | Botea | G06F 16/285 |
| | | | 707/739 |

FOREIGN PATENT DOCUMENTS

| | | | |
|---|---|---|---|
| JP | 2010-026782 A | 2/2010 | |
| JP | 2010-039600 A | 2/2010 | |
| JP | 2011-070408 A | 4/2011 | |
| JP | 2011-221877 A | 11/2011 | |
| JP | 2019-149140 A | 9/2019 | |
| JP | 2019-164402 A | 9/2019 | |

OTHER PUBLICATIONS

Takehiro Yamamoto et al., "Analyzing Effect of Roles on Search Behavior in Collaborative Search", DEIM Forum 2015, The 7th Forum on Data Engineering and Information Management, A8-5, Mar. 4, 2015, Internet<URL:http://db-event.jpn.org/deim2015/paper/215.pdf>.

US Office Action for U.S. Appl. No. 18/274,692, mailed on Apr. 12, 2024.

International Search Report for PCT Application No. PCT/JP2021/013770, mailed on May 25, 2021.

Yandi Xia et al., "Large-Scale Categorization of Japanese Product Titles Using Neural Attention Models," Proceedings of the 15th Conference of the European Chapter of the Association for Computational Linguistics: vol. 2, Short Papers, pp. 663-668, Apr. 2017.

International Search Report for PCT Application No. PCT/JP2021/013793, mailed on May 25, 2021.

US Office Action for U.S. Appl. No. 18/274,692, mailed on Aug. 30, 2024.

\* cited by examiner

FIG. 5
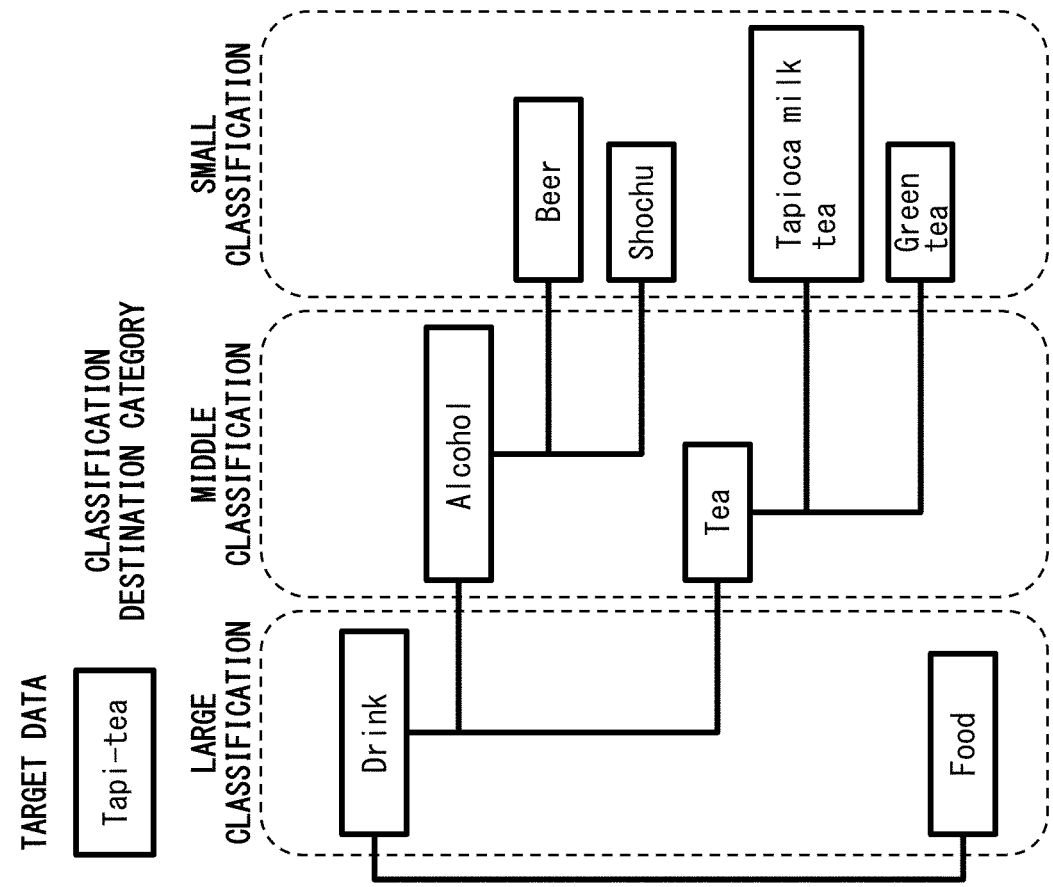
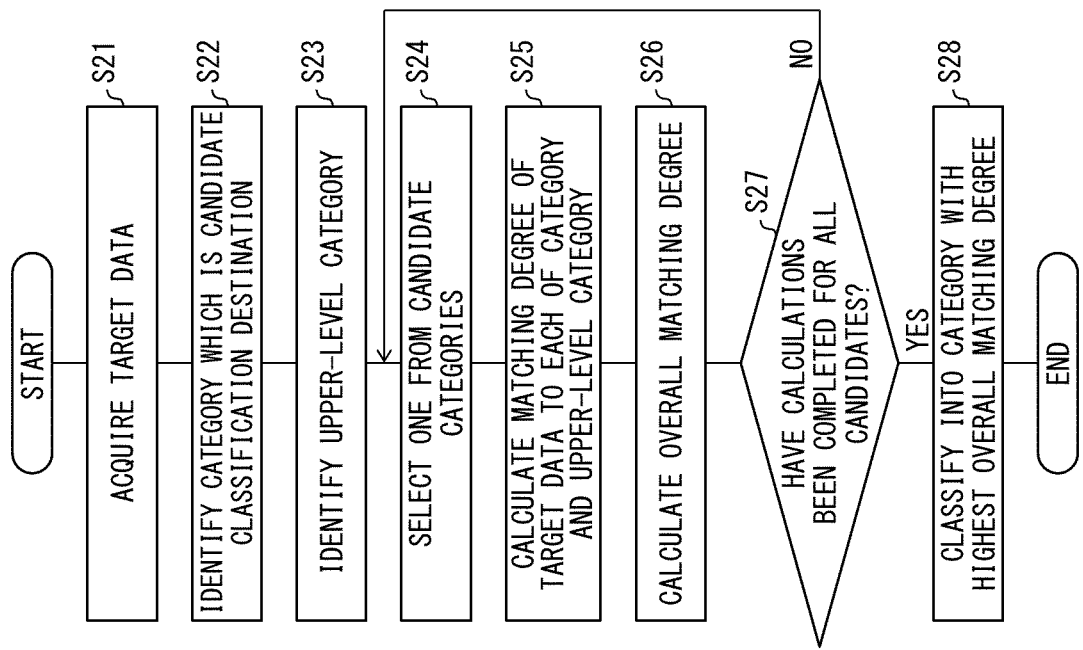

$$(\text{MATCHING DEGREE BETWEEN TARGET DATA AND CATEGORY}) = \sum_{i=1}^{10}\sum_{j=1}^{10} r(i,j) sim(P_i^I, P_j^C) \quad \cdots (2)$$

INFORMATION PROCESSING APPARATUS, CLASSIFICATION METHOD, AND STORAGE MEDIUM

This application is a National Stage Entry of PCT/JP2021/013770 filed on Mar. 31, 2021, the contents of all of which are incorporated herein by reference, in their entirety.

TECHNICAL FIELD

The present invention relates to, for example, an information processing apparatus for classifying data which is to be classified under categories.

BACKGROUND ART

Recently, a large amount of various kinds of data has been collected and accumulated, and the cost of classification performed for effectively utilizing the accumulated data has been increasing accordingly. A technique for reducing such cost is disclosed in, for example, Patent Literature 1 below. Patent Literature 1 below discloses an information processing apparatus for classifying, into various categories, product data regarding products or services for sale through networks.

More specifically, the information processing apparatus disclosed in Patent Literature 1 uses a classifier to determine a category, the classifier being trained with use of training data which is product data classified under hierarchical categories, so as to output a classification result which is a hierarchical category, with respect to a product indicated by inputted product data. With this information processing apparatus, it is possible to automatically classify product data and thus reduce the labor cost of classifying product data.

CITATION LIST

Patent Literature

[Patent Literature 1]
Japanese Patent Application Publication, Tokukai, No. 2019-164402

SUMMARY OF INVENTION

Technical Problem

However, in a case of using a classifier constructed by machine learning, as in Patent Literature 1, there is a problem of being incapable of outputting a highly accurate classification result unless there is sufficient training data for each of the categories. An example object of an example aspect of the present invention is to provide, for example, an information processing apparatus capable of automatically classifying data without use of a classifier constructed by machine learning.

Solution to Problem

An information processing apparatus in accordance with an example aspect of the present invention includes at least one processor, the at least one processor carrying out: a data acquiring process of acquiring target data, which is data to be classified into one of a plurality of categories in a hierarchical structure; and a classifying process of classifying the target data into one of the plurality of categories in accordance with (i) a matching degree indicating a degree to which the target data matches that category and (ii) an upper-level matching degree indicating a degree to which the target data matches an upper-level category of that category.

A classification method in accordance with an example aspect of the present invention includes: acquiring, by at least one processor, target data, which is data to be classified into one of a plurality of categories in a hierarchical structure; and classifying, by the at least one processor, the target data into one of the plurality of categories in accordance with (i) a matching degree indicating a degree to which the target data matches that category and (ii) an upper-level matching degree indicating a degree to which the target data matches an upper-level category of that category.

A storage medium in accordance with an example aspect of the present invention is a computer-readable non-transitory storage medium storing a program, the program causing a computer to carry out: a data acquiring process of acquiring target data, which is data to be classified into one of a plurality of categories in a hierarchical structure; and a classifying process of classifying the target data into one of the plurality of categories in accordance with (i) a matching degree indicating a degree to which the target data matches that category and (ii) an upper-level matching degree indicating a degree to which the target data matches an upper-level category of that category.

Advantageous Effects of Invention

With an example aspect of the present invention, it is possible to automatically classify data without use of a classifier constructed by machine learning.

BRIEF DESCRIPTION OF DRAWINGS

FIG. 5 is a diagram for describing a classification method carried out by the information processing apparatus.

EXAMPLE EMBODIMENTS

First Example Embodiment

The following description will discuss a first example embodiment of the present invention in detail, with reference to the drawings. The present example embodiment is basic to the example embodiments that will be described later.

(Configuration of Information Processing Apparatus 1)

Figure 1:
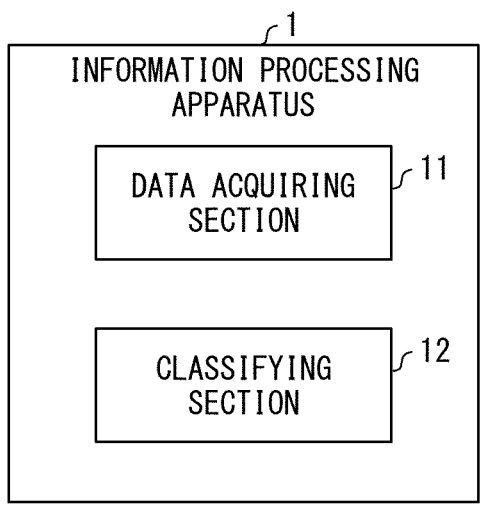
FIG. 1 is a block diagram illustrating a configuration of an information processing apparatus in accordance with a first example embodiment of the present invention.

The configuration of an information processing apparatus 1 in accordance with the present example embodiment will be described below, with reference to FIG. 1. FIG. 1 is a block diagram illustrating a configuration of the information processing apparatus 1. The information processing apparatus 1 includes a data acquiring section 11 and a classifying section 12, as illustrated in FIG. 1.

The data acquiring section 11 acquires target data. The target data is data to be classified into one of a plurality of categories in a hierarchical structure.

The classifying section 12 classifies the target data into one of the plurality of categories in accordance with (i) a matching degree indicating a degree to which the target data matches that category and (ii) an upper-level matching degree indicating a degree to which the target data matches an upper-level category of that category.

As described above, a configuration employed in the information processing apparatus 1 in accordance with the present example embodiment is the configuration including: the data acquiring section 11 for acquiring target data, which is data to be classified into one of a plurality of categories in a hierarchical structure; and the classifying section 12 for classifying the target data into one of the plurality of categories in accordance with (i) a matching degree indicating a degree to which the target data matches that category and (ii) an upper-level matching degree indicating a degree to which the target data matches an upper-level category of that category.

In a case where the categories are organized in a hierarchical structure, when the target data is successfully classified into a correct category, the matching degree between the target data and the upper-level category is highly likely to be high. Assume that, for example, the target data is a product name "Tapi-tea". Furthermore, assume that the correct classification of the target data is "Tea" in the upper-level category and "Tapioca milk tea" in the lower-level category. In this case, "Tapi-tea" has a high matching degree to "Tapioca milk tea" and also a high matching degree to "Tea".

Thus, the target data is classified not only in accordance with a matching degree to a certain category but also in accordance with a matching degree to an upper-level category thereof. With this configuration, it is possible to classify the target data into an appropriate category even in a case where an appropriate category cannot be identified from only a matching degree to a category.

For example, in the above example, assume that there is a classification "Tapioca sour" in the lower-level category. In this case, a matching degree between "Tapi-tea" and "Tapioca sour" is not different from or can be higher than the matching degree between "Tapi-tea" and "Tapioca milk tea". Even in such a case, if the upper-level category of "Tapioca sour" is, for example, "Alcohol", the matching degree of "Tapi-tea" to "Alcohol" is expected to be lower than the matching degree of "Tapi-tea" to "Tea". Thus, the classification in accordance with the matching degree to the upper-level category enables "Tapi-tea" to be correctly classified into "Tapioca milk tea".

In addition, the above configuration eliminates the need to use a classifier constructed by machine learning. Thus, with the above configuration, it is possible to obtain an example advantage of being capable of automatically classifying the target data without use of a classifier constructed by machine learning.

(Transformation Pattern Determination Program)

The above functions of the information processing apparatus 1 can be implemented via a program. A configuration employed in a classification program in accordance with the present example embodiment is the configuration in which the classification program causes a computer to function as: a data acquiring means for acquiring target data, which is data to be classified into one of a plurality of categories in a hierarchical structure; and a classifying means for classifying the target data into one of the plurality of categories in accordance with (i) a matching degree indicating a degree to which the target data matches that category and (ii) an upper-level matching degree indicating a degree to which the target data matches an upper-level category of that category. Accordingly, with the classification program in accordance with the present example embodiment, it is possible to obtain an example advantage of being capable of automatically classifying the target data without use of a classifier constructed by machine learning.

(Process Flow of Classification Method)

Figure 2:
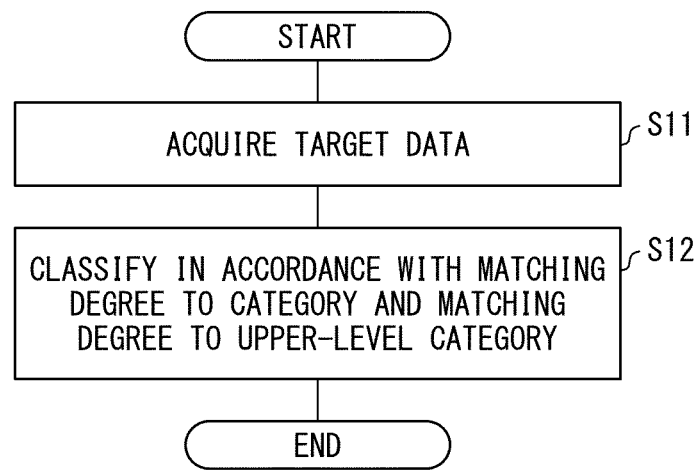
FIG. 2 is a flowchart illustrating a process flow of a classification method in accordance with the first example embodiment of the present invention.

The process flow of a classification method in accordance with the present example embodiment will be described below, with reference to FIG. 2. FIG. 2 is a flowchart illustrating the process flow of the classification method. Each of the steps of this classification method may be carried out by a processor included in the information processing apparatus 1 or a processor included in another apparatus. Alternatively, the steps may be carried out by respective processors provided in different apparatuses.

In S11, at least one processor acquires target data, which is data to be classified into one of a plurality of categories in a hierarchical structure.

In S12, the at least one processor classifies the target data into one of the plurality of categories in accordance with (i) a matching degree indicating a degree to which the target data matches that category and (ii) an upper-level matching degree indicating a degree to which the target data matches an upper-level category of that category.

As described above, a configuration employed in the classification method in accordance with the present example embodiment is the configuration including: acquiring, by at least one processor, target data, which is data to be classified into one of a plurality of categories in a hierarchical structure; and classifying, by the at least one processor, the target data into one of the plurality of categories in accordance with (i) a matching degree indicating a degree to which the target data matches that category and (ii) an upper-level matching degree indicating a degree to which the target data matches an upper-level category of that category. Accordingly, with the classification method in accordance with the present example embodiment, it is possible to obtain an example advantage of being capable of automatically classifying the target data without use of a classifier constructed by machine learning.

Second Example Embodiment (Configuration of Information Processing Apparatus 2)

Figure 3:
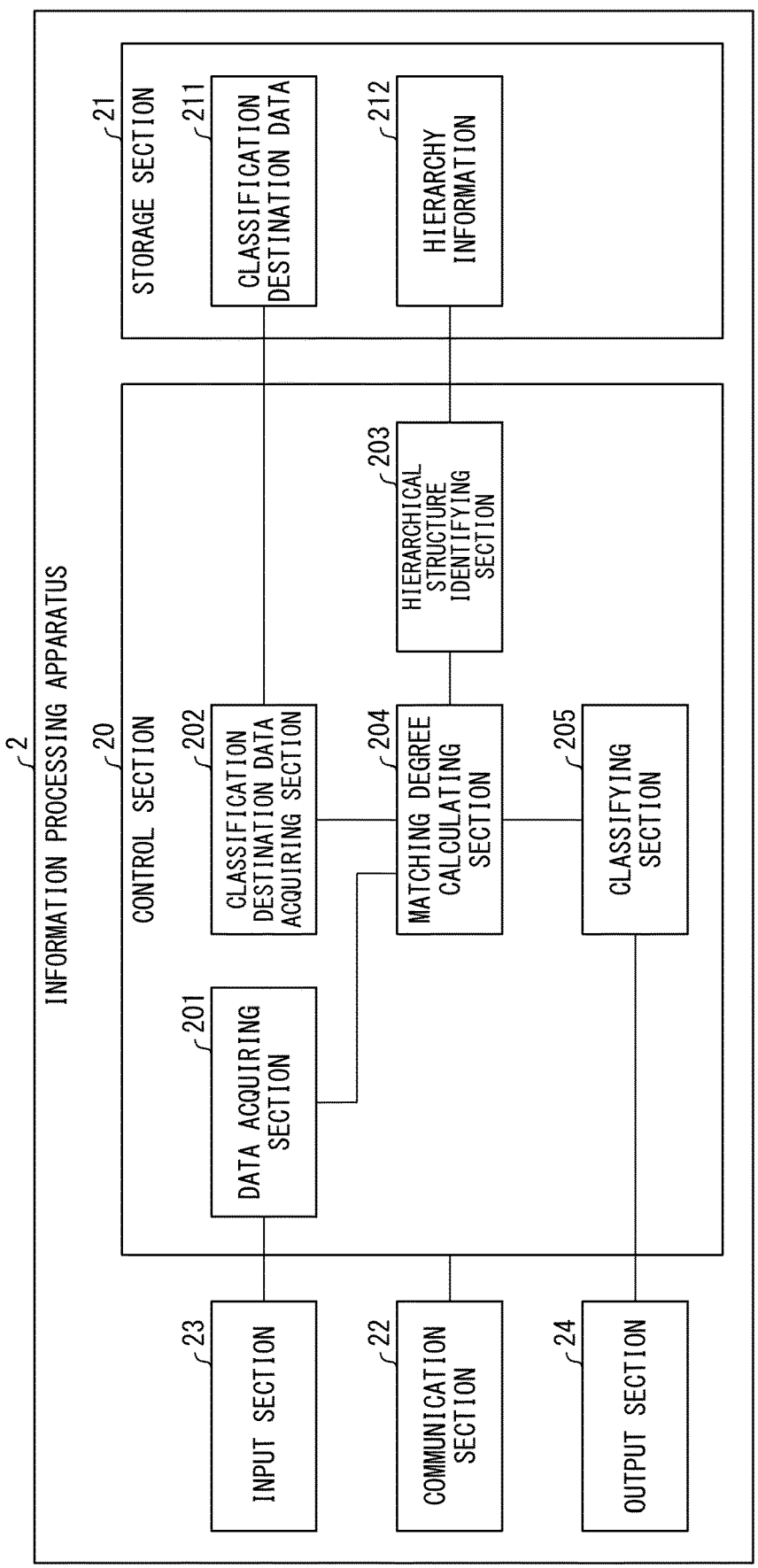
FIG. 3 is a block diagram illustrating a configuration of an information processing apparatus in accordance with a second example embodiment of the present invention.

The configuration of an information processing apparatus 2 will be described below on the basis of FIG. 3. FIG. 3 is a block diagram illustrating a configuration of the information processing apparatus 2. As is illustrated, the information processing apparatus 2 includes: a control section 20 that comprehensively controls the sections of the information processing apparatus 2; and a storage section 21 that stores various kinds of data used by the information processing apparatus 2. The information processing apparatus 2 further includes: a communication section 22 via which the information processing apparatus 2 communicates with another apparatus; an input section 23 that accepts input of various kinds of data to the information processing apparatus 2; and an output section 24 via which the information processing apparatus 2 outputs various kinds of data.

The control section 20 includes: a data acquiring section 201; a classification destination data acquiring section 202; a hierarchical structure identifying section 203; a matching degree calculating section 204; and a classifying section 205. The storage section 21 stores classification destination data 211 and hierarchy information 212.

The data acquiring section 201 acquires target data, which is data to be classified into one of a plurality of categories in a hierarchical structure. The target data may be any data provided that the data can be the object of classification, and may be, for example, text data, image data, or voice data. The target data may be, for example, an item name or the like that is contained in a database or a data table.

The classification destination data acquiring section 202 acquires the classification destination data 211 indicating a plurality of categories which are classification destinations under which the target data is classified, and identifies a category which is a candidate classification destination of the target data. The categories of the classification destinations are not limited to any particular categories, as long as the categories have a hierarchical structure of at least two levels. What is only needed is to predetermine, in the classification destination data 211, intended categories.

The hierarchical structure identifying section 203 identifies the upper-level category of each of the categories which are candidate classification destinations, in accordance with the hierarchy information 212 indicating the hierarchical structure of the categories. Specifically, the hierarchy information 212 indicates the upper-level category and the lower-level category of each of the categories indicated in the classification destination data 211. Note that only a lower-level category is indicated for the top-level category, and only an upper-level category is indicated for the bottom-level category. Thus, the hierarchical structure identifying section 203 can identify the upper-level category of each of the categories which are the candidate classification destinations acquired by the classification destination data acquiring section 202, by referring to the hierarchy information 212.

The matching degree calculating section 204 calculates a matching degree indicating a degree to which the target data matches a category of a candidate classification destination identified by the classification destination data acquiring section 202. The matching degree calculating section 204 calculates an upper-level matching degree indicating a degree to which the target data matches an upper-level category identified by the hierarchical structure identifying section 203. The matching degree calculating section 204 calculates, from the matching degree and the upper-level matching degree, an overall matching degree used by the classifying section 205 for the classification. A method of calculating each of these matching degrees will be described later with reference to FIG. 4.

The classifying section 205 classifies the target data into one of a plurality of categories in accordance with an overall matching degree calculated by the matching degree calculating section 204. As described above, the overall matching degree is calculated in accordance with a matching degree indicating a degree to which the target data matches a category and an upper-level matching degree. Therefore, it can be said that the classifying section 205 classifies the target data in accordance with a matching degree indicating a degree to which the target data matches a category and an upper-level matching degree.

(Method of Overall Matching Degree Calculation)

Figure 4:
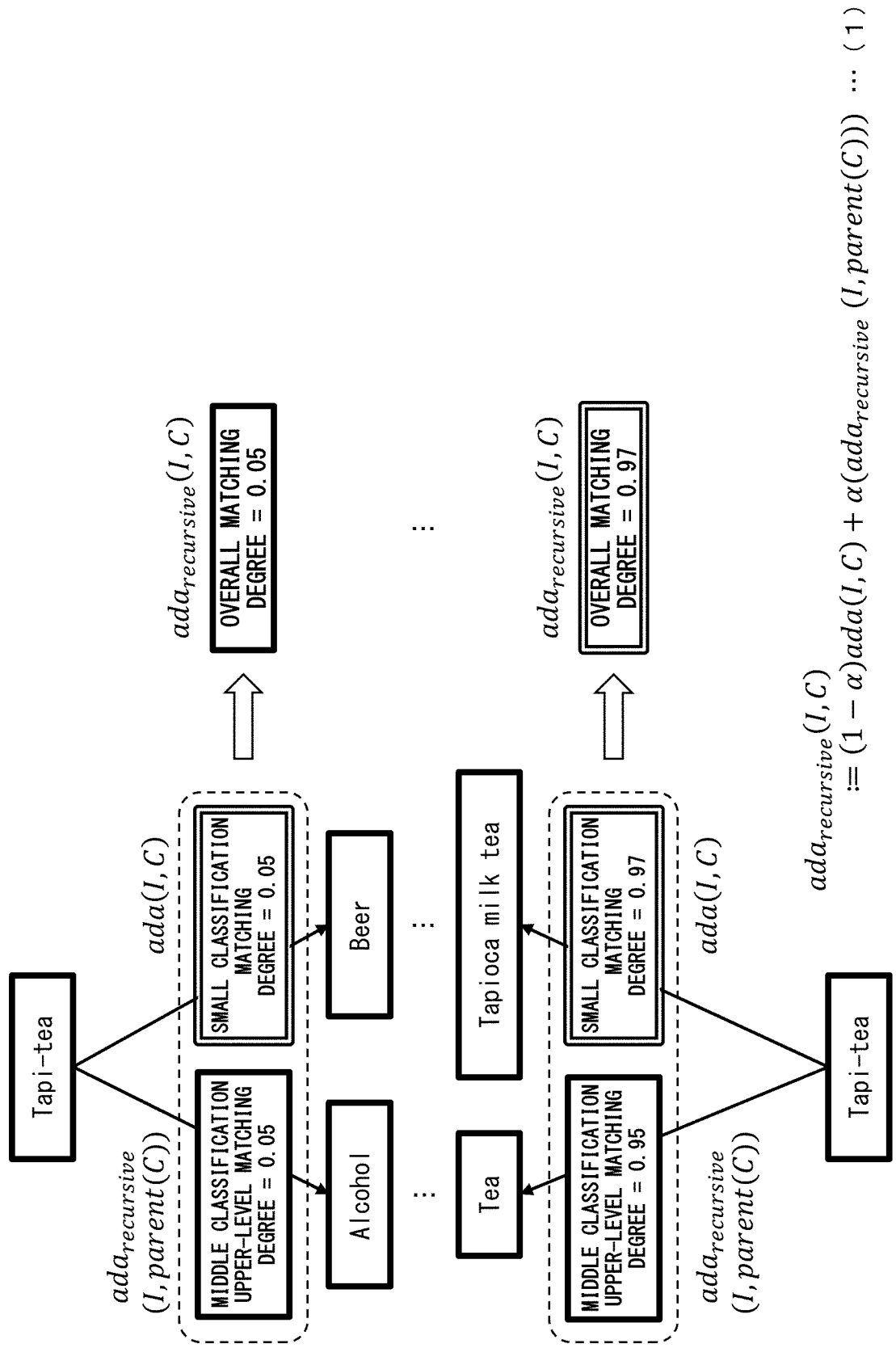
FIG. 4 is a diagram illustrating an example of overall matching degree calculation carried out by the information processing apparatus.

A method of overall matching degree calculation will be described with reference to FIG. 4. FIG. 4 is a diagram illustrating an example of overall matching degree calculation. In this example, the target data is "Tapi-tea", and the candidate classification destinations are "Beer" and "Tapioca milk tea", which are categories of a small classification.

In this example, the classification destination data acquiring section 202 acquires, from the classification destination data 211, the small classification categories "Beer" and "Tapioca milk tea" which are candidate classification destinations. The hierarchical structure identifying section 203 then identifies the upper-level category of "Beer" as "Alcohol" and identifies the upper-level category of "Tapioca milk tea" as "Tea". Note that the hierarchical structure identifying section 203 may identify categories that are further higher in level than the upper-level categories.

Next, the matching degree calculating section 204 calculates a matching degree $ada(I,C)$ between the target data and the category, and calculates an upper-level matching degree $ada_{recursive}(I,parent(C))$ between the target data and the upper-level category.

The matching degree $ada(I,C)$ between the target data and the category only needs to be an index value which becomes a greater value as a possibility that the target data corresponds to the category increases. For example, in a case where a target data name is similar to a category name, as in a case of "Tapi-tea" and "Tea", it can be said that the target data is highly likely to correspond to the category. Therefore, for example, a similarity between the target data name and the category name may be calculated as the matching degree $ada(I,C)$ in accordance with the communality, etc. of character strings included in the names. As in a third example embodiment described later, the matching degree $ada(I,C)$ can be a similarity between target data relevant information relevant to the target data and category relevant information relevant to the category.

In the example of FIG. 4, a matching degree $ada(I,C)$ of the target data "Tapi-tea" to the category "Beer" and an upper-level matching degree $ada_{recursive}(I,parent(C))$ of the target data "Tapi-tea" to the category "Alcohol" (which is the upper-level category of "Beer") are both calculated to be 0.05. A matching degree $ada(I,C)$ of the target data "Tapi-tea" to the category "Tapioca milk tea" is calculated to be 0.97, and an upper-level matching degree $ada_{recursive}(I, parent(C))$ of the target data "Tapi-tea" to the upper-level category "Tea" is calculated to be 0.95.

Here, the matching degree calculating section 204 may calculate an overall matching degree $ada_{recursive}(I,C)$ using Formula (1) illustrated in FIG. 4. Note that a in Formula (1) is a weight value set between 0 and 1. In a case where Formula (1) is used, if a is less than 0.5, a weight assigned to a matching degree ada(I,C) of the target data to the category is greater than a weight assigned to an upper-level matching degree $ada_{recursive}(I,parent(C))$ of the target data to the upper-level category. Therefore, α is preferably less than 0.5. In addition, a weight assigned to a category that is higher in level than the upper-level category is preferably smaller than the weight assigned to the upper-level category. This enables a category closer to a candidate classification destination category to have a higher degree of influence.

For example, when α=0.2, the overall matching degree of "Tapi-tea" to "Beer" is as follows: $ada_{recursive}(I,C)$=0.8× 0.05+0.2×0.05=0.05. The overall matching degree of "Tapi-tea" to "Tapioca milk tea" is as follows: $ada_{recursive}(I,C)$= 0.8×0.97+0.2×0.95=0.97.

The classifying section 205 classifies the target data in accordance with the overall matching degree thus calculated for each of the categories. In the example illustrated in FIG. 4, the classifying section 205 classifies "Tapi-tea" into "Tapioca milk tea" for which the overall matching degree is higher.

As described above, the information processing apparatus 2 in accordance with the present example embodiment includes the matching degree calculating section 204 that calculates, from a matching degree of the target data to a category and an upper-level matching degree, an overall matching degree used by the classifying section 205 for classification. In calculation of the overall matching degree, the matching degree calculating section 204 may assign a greater weight to the matching degree than to the upper-level matching degree.

According to the above configuration, an overall matching degree is calculated while assigning a greater weight to a matching degree of the target data to a certain category than to a matching degree to an upper-level category of the certain category, and the classifying section 205 then classifies the target data using this overall matching degree. Therefore, with the information processing apparatus 2 in accordance with the present example embodiment, it is possible to obtain an example advantage of being capable of classifying the target data with emphasis on a matching degree of the target data to a category, in addition to the example advantage yielded by the information processing apparatus 1 in accordance with the first example embodiment.

(Process Flow of Classification Method)

The process flow of a classification method in accordance with the present example embodiment will be described below, with reference to FIG. 5. FIG. 5 is a diagram for describing a classification method carried out by the information processing apparatus 2. FIG. 5 illustrates an example of target data and a hierarchical structure of categories which are classification destinations of the target data, together with a flowchart illustrating the process flow of the classification method.

In S21, the data acquiring section 201 acquires target data, which is data to be classified into one of a plurality of categories in a hierarchical structure. For example, as illustrated in FIG. 5, in a case where the target data is a word (product name) "Tapi-tea", the data acquiring section 201 acquires text data "Tapi-tea" as the target data.

In S22, the classification destination data acquiring section 202 acquires the classification destination data 211 stored in the storage section 21, and identifies a category which is a candidate classification destination of the target data acquired in S21. For example, in the example illustrated in FIG. 5, in a case where the target data "Tapi-tea" is classified into the small classification, the classification destination data acquiring section 202 identifies "Beer", "Shochu", "Tapioca milk tea" and "Green tea", which are categories of the small classification, from among the categories indicated in the classification destination data 211 and ranging from the large classification to the small classification.

In S23, the hierarchical structure identifying section 203 identifies, in accordance with the hierarchy information 212, an upper-level category of each of the categories identified in S22. Note that the hierarchical structure identifying section 203 may identify, if any, a category that is higher than each of the identified upper-level categories. This process may also be repeated until the top-level category is identified. For example, in a case where there are categories defined in a hierarchy of three levels, that is, a large classification, a middle classification, and a small classification, and small classification categories are identified in S22, the hierarchical structure identifying section 203 identifies at least a middle classification category, and may further identify a large classification category. In a case where there is no upper-level categories of the categories identified in S22, the classification may be carried out in accordance with a similarity between target relevant information and category relevant information.

For example, in a case where the category "Beer" is identified in S22 from among the categories illustrated in FIG. 5, the hierarchical structure identifying section 203 only needs to identify at least "Alcohol" as an upper-level category, and may identify "Drink" which is an upper-level category of "Alcohol". The same applies to other categories.

In S24, the matching degree calculating section 204 selects one category from among the plurality of categories identified in S22. In subsequent S25, the matching degree calculating section 204 calculates a matching degree of the target data acquired in S21 to each of the categories identified in S22. The matching degree calculating section 204 also calculates an upper-level matching degree of the target data acquired in S21 to each of the upper-level categories identified in S23. In S26, the matching degree calculating section 204 calculates an overall matching degree from the matching degrees calculated in S25.

In S27, the matching degree calculating section 204 determines whether calculations of respective overall matching degrees are completed for all of the plurality of categories identified in S22. When it is determined that the calculations have been completed (YES in S27), the process proceeds to the process of S28. Otherwise, when it is determined that the calculations of overall matching degrees have not been completed (NO in S27), the matching degree calculating section 204 returns to the process of S24 and selects one category which has not yet been used for calculation of an overall matching degree.

For example, assume that four categories of the small classification are identified in S22 and categories of the middle classification and the large classification, respectively, are identified in S23 for each of the categories, among the categories illustrated in FIG. 5. In this case, in the processes of S24 through S27, a matching degree of "Tapi-tea" to the category "Beer" is calculated. In addition, an upper-level matching degree of "Tapi-tea" is calculated for each of the upper-level categories "Alcohol" and "Drink". Then, from these matching degree and upper-level matching degrees, an overall matching degree of "Tapi-tea" to the category "Beer" is calculated. An overall matching degree is similarly calculated for each of the remaining three small classification categories "Shochu", "Tapioca milk tea" and "Green tea".

In S28, the classifying section 205 classifies the target data into a category for which an overall matching degree is the highest of the plurality of categories identified in S22. With this, the classification method of FIG. 5 ends.

Third Example Embodiment

The following description will discuss a third example embodiment of the present invention in detail, with reference to the drawings. The same reference sign is assigned to a component that has the same function as the component described in the second example embodiment, and the description thereof is not repeated.

(Configuration of Information Processing Apparatus 2A)

Figure 6:
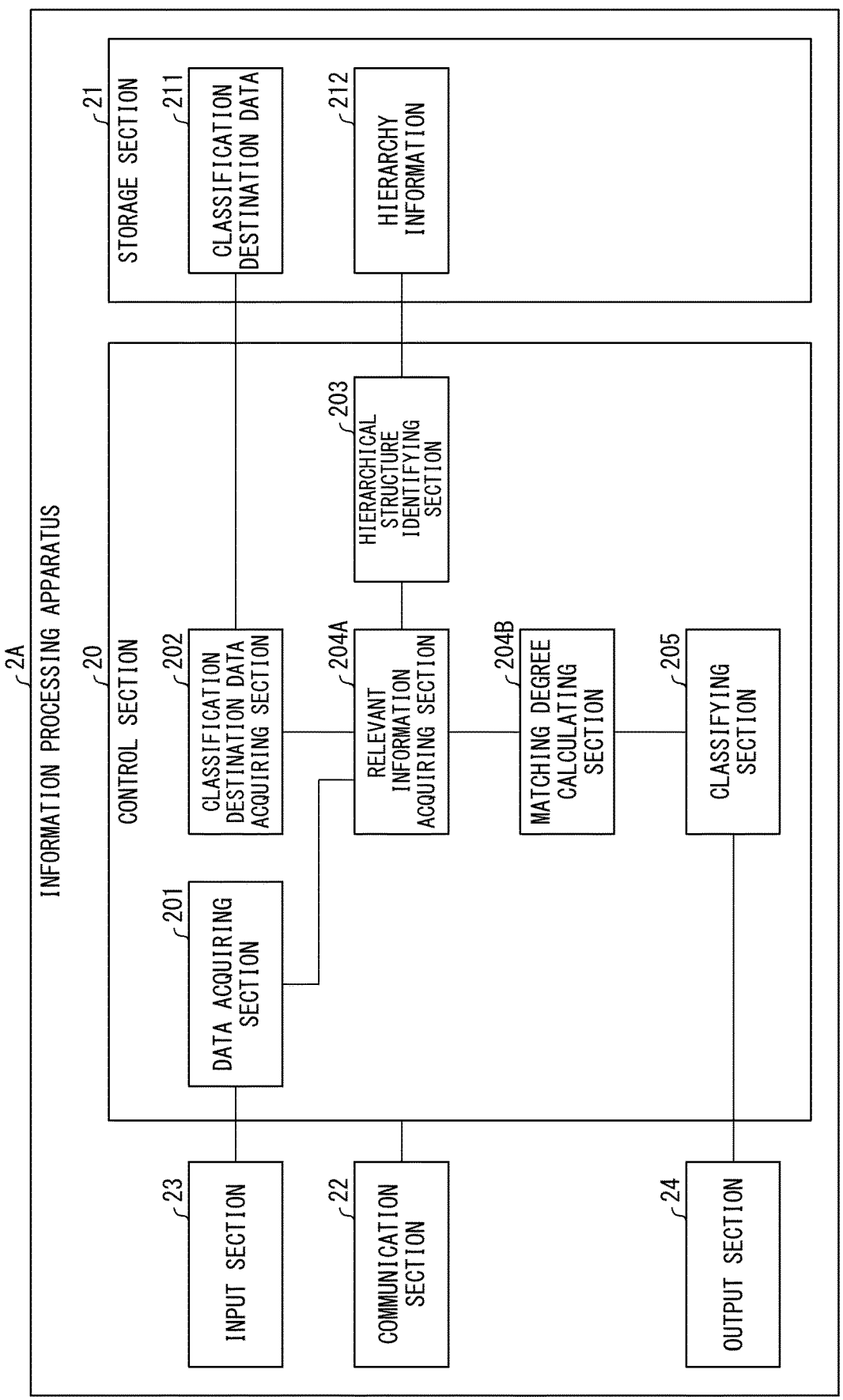
FIG. 6 is a block diagram illustrating a configuration of an information processing apparatus in accordance with a third example embodiment of the present invention.

The configuration of an information processing apparatus 2A in accordance with the present example embodiment will be described below, with reference to FIG. 6. FIG. 6 is a block diagram illustrating a configuration of the information processing apparatus 2A. The information processing apparatus 2A is different from the information processing apparatus 2 illustrated in FIG. 3 in that the information processing apparatus 2A includes a relevant information acquiring section 204A, and in that the matching degree calculating section 204 is replaced with a matching degree calculating section 204B.

The relevant information acquiring section 204A acquires target relevant information relevant to the target data, category relevant information relevant to a category which is a candidate classification destination of the target data, and upper-level category relevant information relevant to an upper-level category of that category.

The target relevant information only needs to be information relevant to the target data. Similarly, the category relevant information only needs to be information relevant to the category, and the upper-level category relevant information only needs to be information relevant to the upper-level category. Hereinafter, target relevant information, category relevant information, and upper-level category relevant information may be collectively referred to simply as relevant information. A method of acquiring each piece of the relevant information will be described later.

The matching degree calculating section 204B calculates a matching degree of the target data to the category in accordance with an extent to which the target relevant information is similar to the category relevant information. The matching degree calculating section 204B calculates an upper-level matching degree in accordance with an extent to which the target relevant information is similar to the upper-level category relevant information.

As described above, the information processing apparatus 2A in accordance with the present example embodiment includes the matching degree calculating section 204B that calculates a matching degree in accordance with an extent to which target relevant information relevant to the target data is similar to category relevant information relevant to the category, and calculates an upper-level matching degree in accordance with an extent to which the target relevant information is similar to upper-level category relevant information relevant to the upper-level category.

When target relevant information relevant to the target data is similar to category relevant information relevant to a category, the target data is highly likely to match the category. Similarly, when target relevant information is similar to upper-level category relevant information relevant to an upper-level category, the target data is highly likely to match the upper-level category.

Thus, the classification of the target data is carried out in accordance with the matching degree calculated in accordance with an extent to which the target relevant information is similar to the category relevant information and the upper-level matching degree calculated in accordance with an extent to which the target relevant information is similar to the upper-level category relevant information. With this configuration, it is possible to obtain an example advantage of being capable of classifying the target data into an appropriate category.

(Method of Acquiring Relevant Information)

The relevant information acquiring section 204A may acquire relevant information by a search. A search location only needs to be a location where various kinds of information that may be relevant to the target data are stored. For example, the relevant information acquiring section 204A may search, for information relevant to the target data, a relevant information database (DB) that stores various kinds of information which may be relevant to the target data, and acquire, as target relevant information, the information detected in the search. The relevant information DB may be stored in the storage section 21 or may be stored in an apparatus external to the information processing apparatus 2A. Alternatively, the relevant information DB may be provided in a distributed manner in a plurality of locations.

For example, in a case where the target data is text data indicating the name of a product, the relevant information DB that stores the various kinds of text data of, for example, descriptions of various products and reviews of the various products may be used. Besides this, for example, a database or data lake of a company that handles a product or a service relevant to the target data may be used as the relevant information DB.

In addition, for example, a database which stores various kinds of data extracted by data enrichment that is carried out with respect to various kinds of data regarding various products and services that can be relevant to the target data may be used as the relevant information DB. Data enrichment is a service for increasing the use value of data to be subjected to data enrichment, by extracting various kinds of information relevant to the data and treating the various kinds of information as additional information of the data. In this case, the category determined by the information processing apparatus 2A may be added to the relevant information DB as information relevant to the target data. In this case, it can be said that the information processing apparatus 2A is carrying out data enrichment of the target data.

In a case where the target data is image data, the relevant information acquiring section 204A may search the relevant information DB for an image similar to the target data and/or text data relevant to the target data.

For example, the relevant information acquiring section 204A may acquire, as the target relevant information, a search result obtained by a web search for the target data. In any of the searches, the search method is not limited to any particular method. For example, in a case of a search by text data, a full match search may be conducted or a partial match search may be conducted.

The relevant information acquiring section 204A acquires category relevant information relevant to a category which is a candidate classification destination, and upper-level category relevant information relevant to an upper-level category of that category, in manners similar to that for the target relevant information.

Methods of acquiring pieces of relevant information may be the same or different. Pieces of information acquired by different acquiring methods may be used as relevant information. For example, the relevant information acquiring section 204A may acquire, as target relevant information, both of a search result obtained by performing a web search for the target data and a search result obtained by searching the relevant information DB for the target data.

(Method of Calculating Similarity Between Pieces of Relevant Information and Method of Calculating Matching Degree in Accordance with Similarity)

Figure 7:
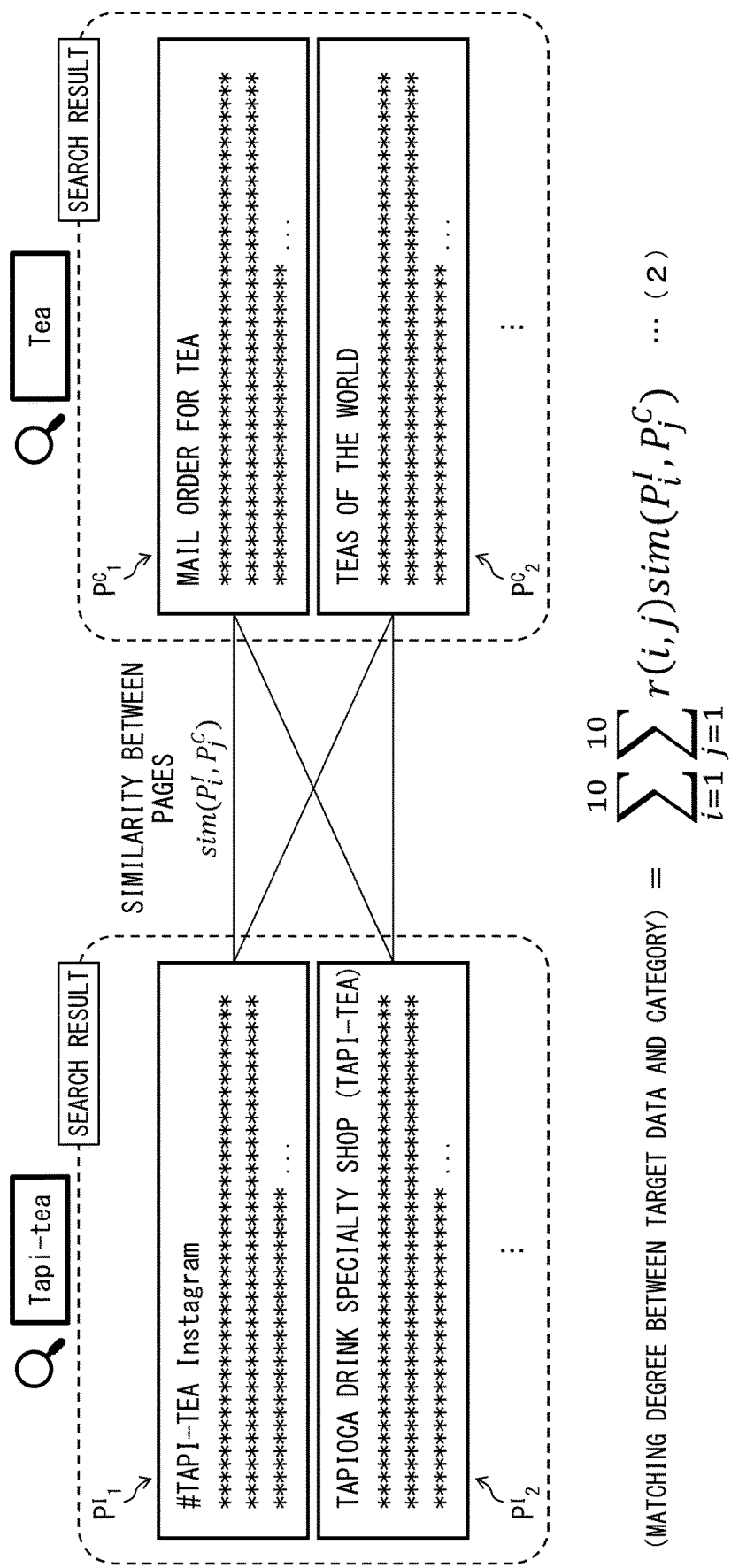
FIG. 7 is a diagram illustrating an example of matching degree calculation based on a similarity between web pages detected in a web search, the matching degree calculation being carried out by the information processing apparatus.

The matching degree calculating section 204B calculates a similarity between the pieces of relevant information acquired as described above, and calculates a matching degree between the target data and the category in accordance with the similarity. Here, a method of calculating a similarity between pieces of relevant information and a method of calculating a matching degree in accordance with the similarity will be described, with reference to FIG. 7. FIG. 7 is a diagram illustrating an example of matching degree calculation based on a similarity between web pages detected in a web search.

FIG. 7 illustrates a web page $P^I_1$ detected as the highest-ranking search result and a web page $P^I_2$ detected as the second highest-ranking search result, of the search results of the target data "Tapi-tea". FIG. 7 illustrates a web page $P^C_1$, which is the highest-ranking search result, and a web page $P^C_2$, which is the second highest-ranking search result, of the search results of the category "Tea".

Thus, a web search is carried out for the target data "Tapi-tea", so that various web pages including the character string "Tapi-tea" are detected. Similarly, a web search is carried out for the category "Tea", so that various web pages including the character string "Tea" are detected. Note that the relevant information acquiring section 204A does not need to treat, as the relevant information, all of the results of web search, and only needs to acquire, as the relevant information, search results that are necessary for calculating the similarity. For example, the relevant information acquiring section 204A may acquire, as relevant information, a predetermined number of high-ranking ones of the web search results.

The matching degree calculating section 204B may use a similarity $sim(P^I_i, P^C_j)$ between the detected web pages to calculate a similarity between the search result of the target data "Tapi-tea" and the search result of the category "Tea".

For example, the matching degree calculating section 204B may calculate a degree to which the web pages or documents for which a similarity is calculated overlap each other in terms of the words used therein, the domain names thereof, or the words used in the file paths thereof, to treat the degree as the similarity $sim(P^I_i, P^C_j)$ between the web pages. For example, the degree of overlap may be calculated with use of Jaccard-Index. In this case, the similarity sim $(P^I_i, P^C_j)$ between the web pages is expressed as the following mathematical formula.

$$sim(P^I_i, P^C_j) = J(bow(P^I_i), bow(P^C_j))$$

Note that $bow(P^I_i)$ is a multi-set consisting of the word count values of the web pages $P^I_i$. Similarly, $bow(P^C_j)$ is a multi-set consisting of the word count values of the web pages $P^C_j$. As a matter of course, Jaccard-Index is merely an example, and any technique for calculating a similarity between sets obtained from search results can be applied.

The matching degree calculating section 204B may use the similarity between the web pages, which has been calculated as described above, to calculate a matching degree between the target data and the category based on Formula (2) illustrated in FIG. 7. The term r(i,j) in Formula (2) is a weight. Specifically, in a case of using Formula (2), the matching degree calculating section 204B carries out, with respect to all combinations of search rankings ranging from first to tenth, an operation of multiplying the similarity between web pages by the weight r(i,j) corresponding to the search rankings of the web pages, and calculates the sum of the operation results as the matching degree between the target data and the category.

As a matter of course, multiplying by a weight is not essential. However, by multiplying by a weight, it is possible to increase the accuracy with which a reasonable similarity is calculated. Thus, multiplying by a weight is preferable. For example, a weight assigned to an extent of similarity between high-ranking search results may be greater than a weight assigned to an extent of similarity between low-ranking search results. This is because high-ranking search results are often deeply relevant to the target data and/or the category than low-ranking search results. Specifically, an example of the weight may be $r(i,j)=(1/i) \cdot (1/j)$.

The similarity calculation method illustrated in FIG. 7 can be similarly applied to calculation of the similarity between search results of searching the relevant information DB. A matching degree between the target data and the upper-level category, that is, an upper-level matching degree can be calculated in a manner similar to that described above.

Here, if the web or the relevant information DB is searched, there is a possibility of obtaining various search results that range from those deeply relevant to the target data and/or the category to those poorly relevant to the target data and/or the category. Accordingly, when the search results contained in the target relevant information and the category relevant information are all poorly relevant to the target data and/or the category, there is a possibility that a reasonable similarity will not be calculated.

To address this, the information processing apparatus 2A in accordance with the present example embodiment may use target relevant information indicating search results ranging from a high-ranking search result to a low-ranking search result, the search results being obtained by searching for information on the target data, as described above. In addition, the information processing apparatus 2A may use category relevant information indicating search results that range from a high-ranking search result to a low-ranking search result, the search results being obtained by searching for information on the category. In addition, the information processing apparatus 2A may use upper-level category relevant information indicating search results that range from a high-ranking search result to a low-ranking search result, the search results being obtained by searching for information on the upper-level category. In this case, the matching degree calculating section 204B calculates the matching degree in accordance with an extent to which each of the search results that are indicated by the respective pieces of relevant information and that range from the high-ranking search result to the low-ranking search result is similar to another search result.

According to the configuration, it is possible to obtain an example advantage of being capable of increasing the accuracy of the matching degree by increasing the possibility that search results that are highly relevant to the target data, the category, and/or the upper-level category are contained in each piece of relevant information, in addition to the example advantage yielded by the information processing apparatus 1 in accordance with the first example embodiment. In addition, even in a case where each piece of relevant information contains search results that are poorly relevant to the target data, the category and/or the upper-level category, it is possible to calculate a reasonable matching degree as a whole.

As described above, a configuration employed in the information processing apparatus 2A in accordance with the present example embodiment may be the configuration in which, in calculating a matching degree, the matching degree calculating section 204B assigns a greater weight to an extent of a similarity between high-ranking search results than to an extent of a similarity between low-ranking search results.

High-ranking search results are often deeply relevant to the target data or category than low-ranking search results. Accordingly, with the information processing apparatus 2A in accordance with the present example embodiment, it is possible to obtain an example advantage of being capable of increasing the accuracy with which a reasonable matching degree is calculated, in addition to the example advantage yielded by the information processing apparatus 1 in accordance with the first example embodiment.

(Process Flow of Classification Method)

Figure 8:
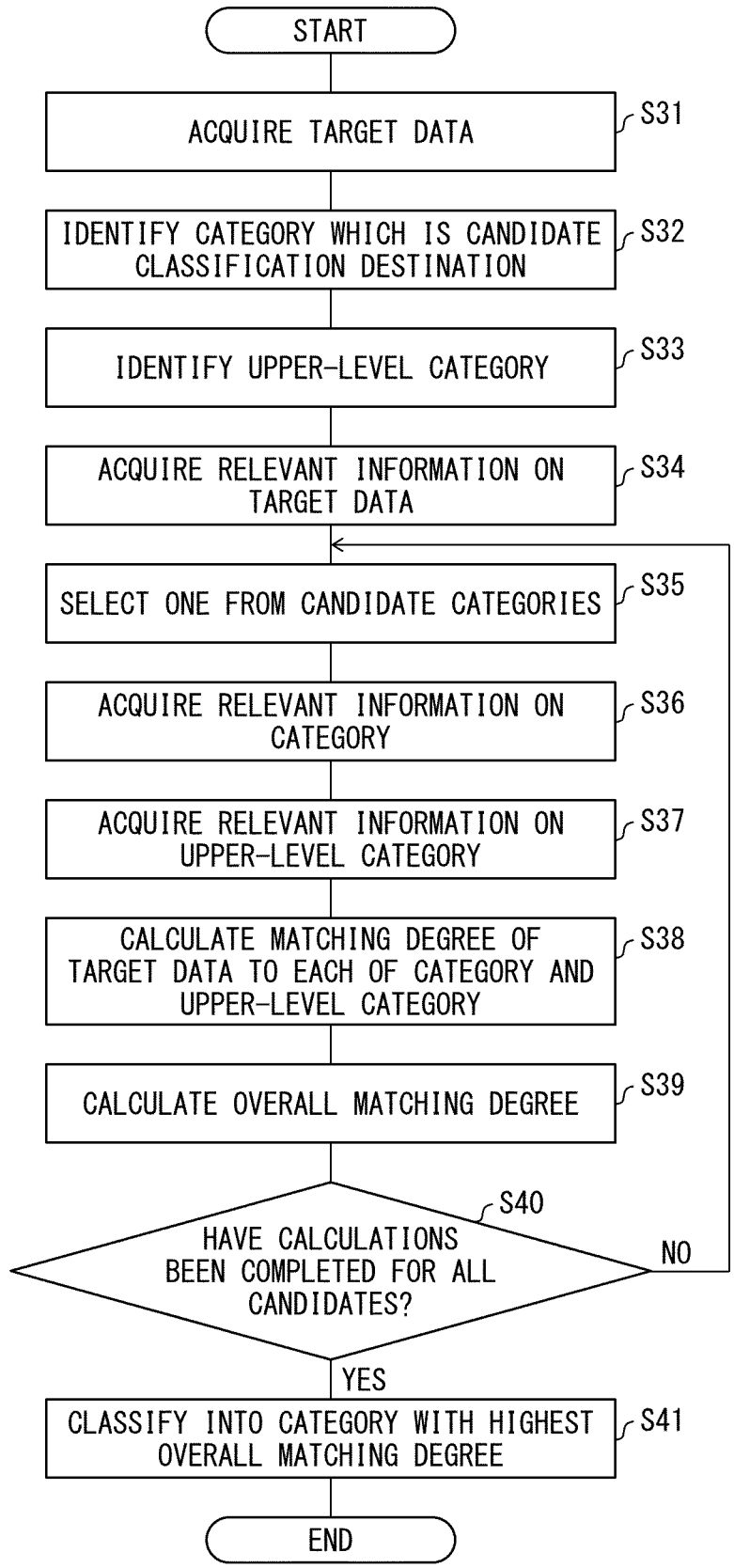
FIG. 8 is a flowchart illustrating a process flow of a classification method carried out by the information processing apparatus.

The process flow of a classification method in accordance with the present example embodiment will be described below, with reference to FIG. 8. FIG. 8 is a flowchart illustrating a process flow of a classification method carried out by the information processing apparatus 2A. Since S31 through S33 and S39 through S41 are similar to S21 through S23 and S27 through S29 in FIG. 5, the descriptions thereof will not be repeated here.

In S34, the relevant information acquiring section 204A acquires target relevant information which is relevant information of the target data acquired in S31. For example, the relevant information acquiring section 204A may acquire, as the target relevant information, a predetermined number of high-ranking ones of search results retrieved for the target data.

In S35, the relevant information acquiring section 204A selects one category from among the plurality of categories identified in S32. In subsequent S36, the relevant information acquiring section 204A acquires, as the category relevant information, information relevant to the category selected in S35. For example, in a manner similar to S34, the relevant information acquiring section 204A may acquire, as the category relevant information, a predetermined number of high-ranking ones of search results retrieved for the category.

In S37, the relevant information acquiring section 204A acquires, as the upper-level category relevant information, information relevant to the upper-level category (identified in S33) of the category selected in S35. For example, in a manner similar to S34 and S36, the relevant information acquiring section 204A may acquire, as the upper-level category relevant information, a predetermined number of high-ranking ones of search results retrieved for the upper-level category.

In S38, the matching degree calculating section 204B calculates a matching degree of the target data to the category in accordance with a similarity between the target relevant information acquired in S34 and the category relevant information acquired in S36. In addition, the matching degree calculating section 204B calculates an upper-level matching degree of the target data to the upper-level category in accordance with a similarity between the target relevant information acquired in S34 and the upper-level category relevant information acquired in S37. In S39, the matching degree calculating section 204B calculates an overall matching degree from the matching degree and the upper-level matching degree which have been calculated in S38.

[Variation]

Any subject may carry out each process described in the above example embodiments, and is not limited to the examples described above. In other words, it is possible to construct an information processing system having the same functions as those of the information processing apparatuses 1, 2, and 2A, with use of a plurality of apparatuses capable of mutual communication. For example, an information processing system having the same functions as those of the information processing apparatuses 2 and 2A can be constructed by dispersedly providing, in a plurality of apparatuses, respective blocks illustrated in FIGS. 3 and 6.

[Software Implementation Example]

Some or all of the functions of each of the information processing apparatuses 1, 2, and 2A may be implemented by hardware such as an integrated circuit (IC chip), or may be implemented by software.

Figure 9:
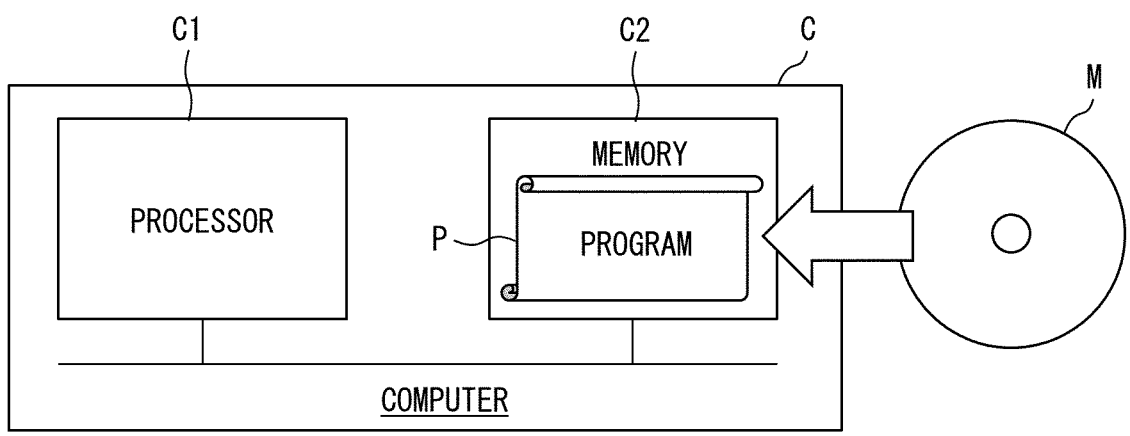
FIG. 9 is a diagram illustrating an example of a computer that executes the instructions of a program that is software for implementing the functions of the information processing apparatus in accordance with each of the example embodiments of the present invention.

In the latter case, the information processing apparatuses 1, 2, and 2A are implemented by, for example, a computer that executes instructions of a program that is software implementing the foregoing functions. An example (hereinafter, computer C) of such a computer is illustrated in FIG. 9. The computer C includes at least one processor C1 and at least one memory C2. The memory C2 stores a program P for causing the computer C to operate as the information processing apparatuses 1, 2, and 2A. The processor C1 of the computer C retrieves the program P from the memory C2 and executes the program P, so that the functions of the information processing apparatuses 1, 2, and 2A are implemented.

Examples of the processor C1 can include a central processing unit (CPU), a graphic processing unit (GPU), a digital signal processor (DSP), a micro processing unit (MPU), a floating point number processing unit (FPU), a physics processing unit (PPU), a microcontroller, and a combination thereof. Examples of the memory C2 include a flash memory, a hard disk drive (HDD), a solid state drive (SSD), and a combination thereof.

The computer C may further include a random access memory (RAM) in which the program P is loaded when executed and in which various kinds of data are temporarily stored. The computer C may further include a communication interface via which data is transmitted to and received from another apparatus. The computer C may further include an input-output interface via which input-output equipment such as a keyboard, a mouse, a display or a printer is connected.

The program P can be stored in a non-transitory tangible storage medium M which is readable by the computer C. Examples of such a storage medium M can include a tape, a disk, a card, a semiconductor memory, and a programmable logic circuit. The computer C can obtain the program P via the storage medium M. Alternatively, the program P can be transmitted via a transmission medium. Examples of such a transmission medium can include a communication network and a broadcast wave. The computer C can also obtain the program P via such a transmission medium.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

[Additional Remark 2]

Some or all of the foregoing example embodiments can also be described as below. Note, however, that the present invention is not limited to the following supplementary notes.

(Supplementary Note 1)

An information processing apparatus, including: a data acquiring means for acquiring target data, which is data to be classified into one of a plurality of categories in a hierarchical structure; and a classifying means for classifying the target data into one of the plurality of categories in accordance with (i) a matching degree indicating a degree to which the target data matches that category and (ii) an upper-level matching degree indicating a degree to which the target data matches an upper-level category of that category. With this configuration, it is possible to automatically classify the target data without use of a classifier constructed by machine learning.

(Supplementary Note 2)

The information processing apparatus according to supplementary note 1, further including: a matching degree calculating means for calculating an overall matching degree from the matching degree and the upper-level matching degree, the overall matching degree being used by the classifying means for the classification, in calculation of the overall matching degree, the matching degree calculating means assigning a greater weight to the matching degree than to the upper-level matching degree. With this configuration, it is possible to classify the target data with emphasis on the matching degree of the target data to the category.

(Supplementary Note 3)

The information processing apparatus according to supplementary note 1 or 2, further including: a matching degree calculating means for calculating the matching degree in accordance with an extent to which target relevant information relevant to the target data is similar to category relevant information relevant to the category, and calculating the upper-level matching degree in accordance with an extent to which the target relevant information is similar to upper-level category relevant information relevant to the upper-level category. With this configuration, it is possible to classify the target data into an appropriate category.

(Supplementary Note 4)

A classification method, including: acquiring, by at least one processor, target data, which is data to be classified into one of a plurality of categories in a hierarchical structure; and classifying, by the at least one processor, the target data into one of the plurality of categories in accordance with (i) a matching degree indicating a degree to which the target data matches that category and (ii) an upper-level matching degree indicating a degree to which the target data matches an upper-level category of that category. With this configuration, it is possible to automatically classify the target data without use of a classifier constructed by machine learning.

(Supplementary Note 5)

A classification program for causing a computer to function as: a data acquiring means for acquiring target data, which is data to be classified into one of a plurality of categories in a hierarchical structure; and a classifying means for classifying the target data into one of the plurality of categories in accordance with (i) a matching degree indicating a degree to which the target data matches that category and (ii) an upper-level matching degree indicating a degree to which the target data matches an upper-level category of that category. With this configuration, it is possible to automatically classify the target data without use of a classifier constructed by machine learning.

[Additional Remark 3]

Some or all of the foregoing example embodiments can further be expressed as follows.

An information processing apparatus including at least one processor, the at least one processor carrying out: a process of acquiring target data, which is data to be classified into one of a plurality of categories in a hierarchical structure; and a process of classifying the target data into one of the plurality of categories in accordance with (i) a matching degree indicating a degree to which the target data matches that category and (ii) an upper-level matching degree indicating a degree to which the target data matches an upper-level category of that category.

This information processing apparatus may further include a memory. The memory may store a classification program for causing the processor to carry out the process of acquiring the target data and the process of classifying the target data into one of the plurality of categories. This classification program may be stored in a computer-readable non-transitory tangible storage medium.

REFERENCE SIGNS LIST

1: Information processing apparatus
11: Data acquiring section (data acquiring means)
12: Classifying section (classifying means)
2: Information processing apparatus
201: Data acquiring section (data acquiring means)
204: Matching degree calculating section (matching degree calculating means)
205: Classifying section (classifying means)
2A: Information processing apparatus
204B: Matching degree calculating section (matching degree calculating means)

What is claimed is:

1. An information processing apparatus, comprising at least one processor, the at least one processor carrying out:
   a data acquiring process of acquiring target data, which is data to be classified into one of a plurality of categories in a hierarchical structure; and
   a classifying process of classifying the target data into one of the plurality of categories in accordance with (i) a matching degree indicating a degree to which the target data matches that category and (ii) an upper-level matching degree indicating a degree to which the target data matches an upper-level category of that category, wherein:
   the at least one processor calculates the matching degree in accordance with an extent to which target relevant information is similar to category relevant information, the target relevant information indicating search results that range from a high-ranking search result to a low ranking search result and that are obtained by searching for information on the target data, the category relevant information indicating search results that range from a high-ranking search result to a low-ranking search result and that are obtained by searching for information on the category, and calculates the upper-level matching degree in accordance with an extent to which the target relevant information is similar to upper-level category relevant information, the upper-level category relevant information indicating search results that range from a high-ranking search result to a low-ranking search result and that are obtained by searching for information on the upper-level category; and in calculation of the matching degree, the at least one processor calculates the matching degree in accordance with an extent to which each of the search results that are indicated by the target relevant information and the category relevant information and that range from the high-ranking search result to the low-ranking search result is similar to another search result, and in calculation of the upper-level matching degree, the at least one processor calculates the upper-level matching degree in accordance with an extent to which each of the search results that are indicated by the target relevant information and the upper-level category relevant information and that range from the high-ranking search result to the low-ranking search result is similar to another search result.

2. The information processing apparatus according to claim 1, wherein:

the at least one processor carries out a matching degree calculating process of calculating an overall matching degree from the matching degree and the upper-level matching degree, the overall matching degree being used in the classifying process for the classification, and in calculation of the overall matching degree in the matching degree calculating process, the at least one processor assigns a greater weight to the matching degree than to the upper-level matching degree.

3. A classification method, comprising:

acquiring, by at least one processor, target data, which is data to be classified into one of a plurality of categories in a hierarchical structure; and classifying, by the at least one processor, the target data into one of the plurality of categories in accordance with (i) a matching degree indicating a degree to which the target data matches that category and (ii) an upper-level matching degree indicating a degree to which the target data matches an upper-level category of that category, wherein:

the at least one processor calculates the matching degree in accordance with an extent to which target relevant information is similar to category relevant information, the target relevant information indicating search results that range from a high-ranking search result to a low-ranking search result and that are obtained by searching for information on the target data, the category relevant information indicating search results that range from a high-ranking search result to a low-ranking search result and that are obtained by searching for information on the category, and calculates the upper-level matching degree in accordance with an extent to which the target relevant information is similar to upper-level category relevant information, the upper-level category relevant information indicating search results that range from a high-ranking search result to a low-ranking search result and that are obtained by searching for information on the upper-level category; and in calculation of the matching degree, the at least one processor calculates the matching degree in accordance with an extent to which each of the search results that are indicated by the target relevant information and the category relevant information and that range from the high-ranking search result to the low-ranking search result is similar to another search result, and in calculation of the upper-level matching degree, the at least one processor calculates the upper-level matching degree in accordance with an extent to which each of the search results that are indicated by the target relevant information and the upper-level category relevant information and that range from the high-ranking search result to the low-ranking search result is similar to another search result.

4. A computer-readable non-transitory storage medium storing a program, the program causing a computer to carry out:

a data acquiring process of acquiring target data, which is data to be classified into one of a plurality of categories in a hierarchical structure; and a classifying process of classifying the target data into one of the plurality of categories in accordance with (i) a matching degree indicating a degree to which the target data matches that category and (ii) an upper-level matching degree indicating a degree to which the target data matches an upper-level category of that category, wherein:

in the classifying process, the program causes the computer to carry out a process of calculating the matching degree in accordance with an extent to which target relevant information is similar to category relevant information, the target relevant information indicating search results that range from a high-ranking search result to a low-ranking search result and that are obtained by searching for information on the target data, the category relevant information indicating search results that range from a high-ranking search result to a low-ranking search result and that are obtained by searching for information on the category, and calculating the upper-level matching degree in accordance with an extent to which the target relevant information is similar to upper-level category relevant information, the upper-level category relevant information indicating search results that range from a high-ranking search result to a low-ranking search result and that are obtained by searching for information on the upper-level category;

in calculation of the matching degree, the program causes the computer to calculate the matching degree in accordance with an extent to which each of the search results that are indicated by the target relevant information and the category relevant information and that range from the high-ranking search result to the low-ranking search result is similar to another search result; and in calculation of the upper-level matching degree, the program causes the computer to calculate the upper-level matching degree in accordance with an extent to which each of the search results that are indicated by the target relevant information and the upper-level category relevant information and that range from the high-ranking search result to the low-ranking search result is similar to another search result.

* * * * *